(12) United States Patent
Agarwal et al.

(10) Patent No.: US 8,929,360 B2
(45) Date of Patent: Jan. 6, 2015

(54) SYSTEMS, METHODS, MEDIA, AND MEANS FOR HIDING NETWORK TOPOLOGY

(75) Inventors: Kaitki Agarwal, Westford, MA (US); Rajat Ghai, Sandwich, MA (US)

(73) Assignee: Cisco Technology, Inc., San Jose, CA (US)

( * ) Notice: Subject to any disclaimer, the term of this patent is extended or adjusted under 35 U.S.C. 154(b) by 300 days.

(21) Appl. No.: 11/939,914

(22) Filed: Nov. 14, 2007

(65) Prior Publication Data

US 2008/0137686 A1 Jun. 12, 2008

Related U.S. Application Data

(60) Provisional application No. 60/873,493, filed on Dec. 7, 2006.

(51) Int. Cl.
| | |
|---|---|
| H04L 12/66 | (2006.01) |
| H04L 12/26 | (2006.01) |
| H04L 12/721 | (2013.01) |
| H04W 4/02 | (2009.01) |
| H04L 29/06 | (2006.01) |
| H04L 29/08 | (2006.01) |
| H04L 12/741 | (2013.01) |
| H04L 12/851 | (2013.01) |

(52) U.S. Cl.
CPC .............. *H04L 45/38* (2013.01); *H04W 4/02* (2013.01); *H04L 65/80* (2013.01); *H04L 65/103* (2013.01); *H04L 67/18* (2013.01); *H04L 45/74* (2013.01); *H04L 47/2483* (2013.01); *Y10S 707/918* (2013.01); *Y10S 707/913* (2013.01); *Y10S 707/912* (2013.01); *H04L 29/06197* (2013.01); *H04L 65/1006* (2013.01)
USPC ........... 370/356; 370/392; 370/401; 707/918; 707/913; 707/912

(58) Field of Classification Search
USPC .......... 370/245, 352, 401; 709/213, 238, 245; 455/445
See application file for complete search history.

(56) References Cited

U.S. PATENT DOCUMENTS

| | | | | |
|---|---|---|---|---|
| 5,850,441 | A | * 12/1998 | Townsend et al. | ............ 380/283 |
| 5,892,924 | A | * 4/1999 | Lyon et al. | .................... 709/245 |

(Continued)

FOREIGN PATENT DOCUMENTS

| | | |
|---|---|---|
| EP | 1414212 | 4/2004 |
| EP | 2092766 | 8/2009 |

(Continued)

OTHER PUBLICATIONS

International Search Report and Written Opinion issued for International Patent Application No. PCT/US2007/086747.

(Continued)

*Primary Examiner* — Marsha D Banks Harold
*Assistant Examiner* — Christopher Wyllie
(74) *Attorney, Agent, or Firm* — Wilmer Cutler Pickering Hale and Dorr LLP

(57) ABSTRACT

Systems, methods, media, and means for hiding network topology are provided. In some embodiments, methods for hiding network topology are provided, the methods including: receiving a message including topology information from a sender; removing at least part of the topology information; associating the removed topology information with an identifier; saving the topology information; sending the message to a receiver; receiving a response from the receiver; retrieving the removed topology information based on the identifier; inserting the removed topology information into the response; and sending the response to the sender.

27 Claims, 5 Drawing Sheets

(56) References Cited

U.S. PATENT DOCUMENTS

| | | | |
|---|---|---|---|
| 6,119,234 A * | 9/2000 | Aziz et al. | 726/11 |
| 6,138,156 A | 10/2000 | Fletcher et al. | |
| 6,327,471 B1 | 12/2001 | Song | |
| 6,431,875 B1 | 8/2002 | Elliott et al. | |
| 6,477,590 B1 | 11/2002 | Habusha et al. | |
| 6,687,252 B1 | 2/2004 | Bertrand et al. | |
| 6,714,987 B1 | 3/2004 | Amin et al. | |
| 6,775,273 B1 | 8/2004 | Kung et al. | |
| 6,778,494 B1 | 8/2004 | Mauger | |
| 6,792,461 B1 * | 9/2004 | Hericourt | 709/225 |
| 6,810,259 B1 | 10/2004 | Zhang | |
| 6,847,991 B1 * | 1/2005 | Kurapati | 709/213 |
| 6,853,630 B1 | 2/2005 | Manning | |
| 6,854,014 B1 | 2/2005 | Amin et al. | |
| 6,888,821 B2 | 5/2005 | Rasanen et al. | |
| 6,973,309 B1 | 12/2005 | Rygula et al. | |
| 6,978,380 B1 | 12/2005 | Husain et al. | |
| 6,996,087 B2 * | 2/2006 | Ejzak | 370/338 |
| 7,222,359 B2 * | 5/2007 | Freund et al. | 726/3 |
| 7,454,206 B1 | 11/2008 | Phillips et al. | |
| 7,474,894 B2 | 1/2009 | Cardina et al. | |
| 7,613,836 B2 | 11/2009 | Tober et al. | |
| 7,701,974 B2 * | 4/2010 | Mayer et al. | 370/474 |
| 7,702,785 B2 * | 4/2010 | Bruton et al. | 709/225 |
| 7,817,635 B2 * | 10/2010 | Akhtar et al. | 370/392 |
| 8,200,827 B1 * | 6/2012 | Hunyady et al. | 709/227 |
| 2001/0026550 A1 * | 10/2001 | Kobayashi | 370/389 |
| 2002/0029260 A1 | 3/2002 | Dobbins et al. | |
| 2002/0031131 A1 * | 3/2002 | Yemini et al. | 370/401 |
| 2002/0131404 A1 | 9/2002 | Mehta et al. | |
| 2002/0194378 A1 * | 12/2002 | Foti | 709/246 |
| 2003/0002496 A1 * | 1/2003 | Beier | 370/389 |
| 2003/0016630 A1 | 1/2003 | Vega-Garcia et al. | |
| 2003/0026260 A1 * | 2/2003 | Ogasawara et al. | 370/392 |
| 2003/0027595 A1 * | 2/2003 | Ejzak | 455/560 |
| 2003/0050076 A1 | 3/2003 | Watanabe | |
| 2003/0055962 A1 * | 3/2003 | Freund et al. | 709/225 |
| 2003/0058872 A1 | 3/2003 | Berggreen et al. | |
| 2003/0159067 A1 * | 8/2003 | Stirbu | 713/201 |
| 2003/0182435 A1 * | 9/2003 | Redlich et al. | 709/229 |
| 2003/0188012 A1 * | 10/2003 | Ford | 709/238 |
| 2003/0225897 A1 * | 12/2003 | Krawetz | 709/229 |
| 2003/0227880 A1 | 12/2003 | Heller et al. | |
| 2004/0006573 A1 | 1/2004 | Takashi | |
| 2004/0009761 A1 * | 1/2004 | Money et al. | 455/406 |
| 2004/0047290 A1 | 3/2004 | Komandur et al. | |
| 2004/0054929 A1 | 3/2004 | Serpa | |
| 2004/0068574 A1 | 4/2004 | Costa Requena et al. | |
| 2004/0109414 A1 | 6/2004 | Choi et al. | |
| 2004/0109459 A1 | 6/2004 | Madour et al. | |
| 2004/0111476 A1 | 6/2004 | Trossen et al. | |
| 2004/0122954 A1 | 6/2004 | Shaheen | |
| 2004/0122967 A1 | 6/2004 | Bressler et al. | |
| 2004/0137918 A1 | 7/2004 | Varonen et al. | |
| 2004/0139230 A1 * | 7/2004 | Kim | 709/245 |
| 2004/0152469 A1 * | 8/2004 | Yla-Outinen et al. | 455/453 |
| 2004/0181686 A1 * | 9/2004 | Krause et al. | 713/201 |
| 2004/0224688 A1 | 11/2004 | Fischer | |
| 2004/0228331 A1 * | 11/2004 | Hansen et al. | 370/352 |
| 2004/0252694 A1 * | 12/2004 | Adhikari et al. | 370/395.2 |
| 2005/0002381 A1 * | 1/2005 | Westman et al. | 370/352 |
| 2005/0005025 A1 | 1/2005 | Harville et al. | |
| 2005/0009520 A1 | 1/2005 | Herrero et al. | |
| 2005/0021713 A1 | 1/2005 | Dugan et al. | |
| 2005/0083974 A1 * | 4/2005 | Mayer et al. | 370/474 |
| 2005/0105526 A1 * | 5/2005 | Stiemerling et al. | 370/389 |
| 2005/0111450 A1 | 5/2005 | Miyamoto et al. | |
| 2005/0124341 A1 | 6/2005 | Myllymaki et al. | |
| 2005/0190740 A1 | 9/2005 | Zhao et al. | |
| 2005/0201357 A1 * | 9/2005 | Poyhonen | 370/352 |
| 2005/0204052 A1 | 9/2005 | Wang et al. | |
| 2005/0220095 A1 * | 10/2005 | Narayanan et al. | 370/389 |
| 2005/0233727 A1 | 10/2005 | Poikselka et al. | |
| 2006/0015615 A1 * | 1/2006 | Merle et al. | 709/225 |
| 2006/0025132 A1 | 2/2006 | Karaoguz et al. | |
| 2006/0031536 A1 * | 2/2006 | Eydelman et al. | 709/228 |
| 2006/0031559 A1 | 2/2006 | Sorokopud et al. | |
| 2006/0045064 A1 * | 3/2006 | Qin et al. | 370/351 |
| 2006/0046714 A1 | 3/2006 | Kalavade | |
| 2006/0058056 A1 | 3/2006 | Das et al. | |
| 2006/0067244 A1 | 3/2006 | Sekaran et al. | |
| 2006/0104431 A1 | 5/2006 | Emery et al. | |
| 2006/0146792 A1 | 7/2006 | Ramachandran et al. | |
| 2006/0155871 A1 * | 7/2006 | Ilkka et al. | 709/238 |
| 2006/0193295 A1 | 8/2006 | White et al. | |
| 2006/0211423 A1 * | 9/2006 | Ejzak et al. | 455/445 |
| 2006/0239255 A1 | 10/2006 | Ramachandran et al. | |
| 2006/0251050 A1 | 11/2006 | Karlsson | |
| 2006/0256751 A1 | 11/2006 | Jagadeesan et al. | |
| 2006/0256779 A1 | 11/2006 | Lim et al. | |
| 2006/0264213 A1 | 11/2006 | Thompson | |
| 2006/0270404 A1 | 11/2006 | Tuohino et al. | |
| 2007/0022199 A1 | 1/2007 | Tatsubori | |
| 2007/0025301 A1 | 2/2007 | Petersson et al. | |
| 2007/0036078 A1 | 2/2007 | Chowdhury et al. | |
| 2007/0036079 A1 | 2/2007 | Chowdury et al. | |
| 2007/0041320 A1 | 2/2007 | Chen et al. | |
| 2007/0058561 A1 | 3/2007 | Virgile | |
| 2007/0066286 A1 | 3/2007 | Hurtta | |
| 2007/0076729 A1 * | 4/2007 | Takeda | 370/401 |
| 2007/0082681 A1 | 4/2007 | Kim et al. | |
| 2007/0097967 A1 | 5/2007 | Kauppinen et al. | |
| 2007/0118656 A1 | 5/2007 | Anderson et al. | |
| 2007/0156869 A1 | 7/2007 | Galchev et al. | |
| 2007/0184779 A1 * | 8/2007 | Park et al. | 455/41.2 |
| 2007/0195805 A1 * | 8/2007 | Lindgren | 370/401 |
| 2007/0206515 A1 | 9/2007 | Andreasen et al. | |
| 2007/0206617 A1 | 9/2007 | Andreasen et al. | |
| 2007/0209061 A1 | 9/2007 | Dekeyzer et al. | |
| 2007/0253371 A1 | 11/2007 | Harper et al. | |
| 2007/0254673 A1 | 11/2007 | Stenberg et al. | |
| 2007/0271379 A1 * | 11/2007 | Carlton et al. | 709/225 |
| 2008/0002592 A1 | 1/2008 | Yegani et al. | |
| 2008/0020775 A1 | 1/2008 | Willars | |
| 2008/0052387 A1 | 2/2008 | Heinz et al. | |
| 2008/0080525 A1 * | 4/2008 | Chatilov et al. | 370/401 |
| 2008/0084867 A1 * | 4/2008 | Foti et al. | 370/352 |
| 2008/0095339 A1 | 4/2008 | Elliott et al. | |
| 2008/0130637 A1 | 6/2008 | Kant et al. | |
| 2008/0137541 A1 | 6/2008 | Agarwal et al. | |
| 2008/0219218 A1 | 9/2008 | Rydnell et al. | |
| 2008/0233947 A1 | 9/2008 | Herrero-Veron | |
| 2008/0254768 A1 | 10/2008 | Faccin | |
| 2009/0054037 A1 | 2/2009 | Kaippallimalil | |
| 2009/0077647 A1 * | 3/2009 | Schwartz | 726/11 |
| 2009/0109845 A1 | 4/2009 | Andreasen et al. | |
| 2009/0129388 A1 * | 5/2009 | Akhtar et al. | 370/392 |
| 2009/0285225 A1 | 11/2009 | Dahod | |

FOREIGN PATENT DOCUMENTS

| | | |
|---|---|---|
| WO | WO-01/22642 | 3/2001 |
| WO | WO-2007/081727 | 7/2007 |
| WO | WO-2008/070869 | 6/2008 |
| WO | WO-2009/067445 | 5/2009 |

OTHER PUBLICATIONS

<http://www.acmepacket.com/html/page.asp?PageID=%7bFB2657BA-EE7A-46C1-BEA8-F650C93BF5C3%7d>, printed on Dec. 5, 2009.

<http://www.3gpp.org/ftp/Specs/html-info/24229.htm>, printed on Dec. 5, 2009.

CT Labs Report, "SIP and RTP Denial of Service Attack Tests Summary Report", pp. 1-4, 2005.

3GPP TS 24.229 V6.12.0 (Sep. 2006), pp. 1-304, Oct. 3, 2006.

3GPP TS 23.401 v8.3.0 (Sep. 2008), 3rd Generation Partnership Project; Technical Specification Group Services and System Aspects; General Packet Radio Services (GPRS) enhancements for Evolved Universal Terrestrial Radio Access Network (E-UTRAN) access (Release 8), http://www.3gpp.org (204 pages).

3GPP TS 29.274 v1.3.0 (Oct. 2008), 3rd Generation Partnership Project; Technical Specification Group Core Network and Terminals;

(56) References Cited

OTHER PUBLICATIONS

3GPP Evolved Packet System; Evolved GPRS Tunnelling Protocol for Control Plane (GTPv2-C0; Stage 3 (Release 8); http://www.3gpp.org (1 page).

3GPP TS 36.413 v8.3.0 (Sep. 2008), 3rd Generation Partnership Project; Technical Specification Group Radio Access Network; Evolved Universal Terrestrial Radio Access Network (E-UTRAN0); S1 Application Protocol (S1AP) (Release 8), http://www.3gpp.org (184 pages).

International Search Report for International Application No. PCT/US09/64823 mailed Feb. 12, 2010 (1 page).

Nguyen-Vuong. "Mobility Management in 4G Wireless Heterogeneous Networks", PhD thesis. Jul. 2, 2008. www.biblio.univ.evry.fr/theses/2008/2008EVRY00007.pdf (171 pages).

Partial International Search Report issued for International Patent Application No. PCT/US2007/000132 dated Aug. 9, 2007 (2 pages).

International Search Report and Written Opinion issued for International Patent Application No. PCT/US2007/086747, issued on May 7, 2008 (6 pages).

International Search Report and Written Opinion for corresponding International Patent Application No. PCT/US2007/086884 issued on Apr. 10, 2008 (4 pages).

International Search Report and Written Opinion for corresponding International Patent Application No. PCT/US2009/043696 issued on Jun. 24, 2009 (5 pages).

International Search Report and Written Opinion for PCT Application No. PCT/US07/86808 issued on Apr. 10, 2008 (4 pages).

International Search Report and Written Opinion for PCT Application No. PCT/US07/86886 mailed Apr. 10, 2008 (4 pages).

International Search Report and Written Opinion for PCT Application No. PCT/US2007/000132 mailed on Oct. 2, 2007 (12 pages).

International Search Report and Written Opinion for PCT Application No. PCT/US2008/83911 issued on Jan. 12, 2009 (5 pages).

International Search Report and Written Opinion issued for International Patent Application No. PCT/US2007/086802 issued on May 20, 2008 (6 pages).

\* cited by examiner

SYSTEMS, METHODS, MEDIA, AND MEANS FOR HIDING NETWORK TOPOLOGY

CROSS-REFERENCE TO RELATED APPLICATION

This application claims the benefit under 35 U.S.C. §119 (e) of U.S. Provisional Patent Application No. 60/873,493, filed Dec. 7, 2006, which is hereby incorporated by reference herein in its entirety.

TECHNICAL FIELD

The disclosed subject matter relates to systems, methods, media, and means hiding network topology.

BACKGROUND

Digital devices often exchange messages to communicate with each other. These messages can contain not only the information meant to be communicated, but also other information such as routing information. In some cases, network topology information can be determined by examining, for example, routing information exchanged between digital devices. For example, when sending a message, a sender may insert routing information into the message and send the message to a receiver on a path that travels through various other devices. Some of these devices may add further routing information, such as their network addresses, to the routing information associated with the message. The receiver of the message can include the routing information in its response so that the response can be correctly routed back to the sender. However, network providers may wish to keep this routing information away from, for example, attackers, other networks, network subscribers, or any entity that does require access to the information.

One reason to keep network topology information private is that attackers can use this information to identify parts of a network for attack. For example, an attacker masquerading as a legitimate user may examine the headers of a packet it receives from a network to determine the address of a critical component of that network. The attacker may then directly target the critical component with an attack, such as, for example, a denial-of-service (DoS) attack. A network provider may also want to keep network topology information private for reasons other than attack avoidance. For example, an IP address read from a packet header may reveal that a network provider has contracted to use the equipment of another entity (e.g., a competitor, a sub contractor, etc.). However, the network provider may have preferred to keep this information confidential for business reasons.

One method that can be used to protect network routing information in packets is encryption. For example, a network component that sends a packet to a mobile device can encrypt topology information that is needed by the network for routing responses from mobile devices, but is not directly needed by the mobile devices. A mobile device can insert the encrypted topology information into its response to the network component. The network can then decrypt the encrypted topology information and use it as necessary. However, mere encryption of the header may still leave the network vulnerable. For example, topology information may be inadvertently or maliciously removed such that the packet lacks proper routing information. Alternatively, an encrypted header may be altered so that a response cannot be routed or is routed improperly. It is also possible that an attacker may be able to decrypt an encrypted header and thus access the header and its now unprotected topology information.

SUMMARY

Systems, methods, media, and means for hiding network topology are provided. In some embodiments, methods for hiding network topology are provided, the methods including: receiving a message including topology information from a sender; removing at least part of the topology information; associating the removed topology information with an identifier; saving the topology information; sending the message to a receiver; receiving a response from the receiver; retrieving the removed topology information based on the identifier; inserting the removed topology information into the response; and sending the response to the sender.

In some embodiments, computer-readable media storing computer-executable instructions that, when executed by a processor, cause the processor to perform methods for hiding network topology are provided, the methods including: receiving a message including topology information from a sender; removing at least part of the topology information; associating the removed topology information with an identifier; saving the topology information; sending the message to a receiver; receiving a response from the receiver; retrieving the removed topology information based on the identifier; inserting the removed topology information into the response; and sending the response to the sender.

In some embodiments, a intermediate apparatus in a network, including: a memory; an interface; and a processor in communication with the memory and the interface is provided, wherein the processor: receives a message including topology information from the interface; removes at least part of the topology information; associates the removed topology information with an identifier; saves the topology information in the memory; sends the message through the interface; receives a response from the interface; retrieves the removed topology information from the memory based on the identifier; inserts the removed topology information into the response; and sends the response to the through the interface.

In some embodiments, a wireless communication system is provided, including: means for receiving a message including topology information from a sender; means for removing at least part of the topology information; means for associating the removed topology information with an identifier; means for saving the topology information; means for sending the message to a receiver; means for receiving a response from the receiver; means for retrieving the removed topology information based on the identifier; means for inserting the removed topology information into the response; and means for sending the response to the sender.

DETAILED DESCRIPTION

Systems and methods for inhibiting access to network topology information are disclosed. Using some embodiments of the disclosed subject matter, an intermediate can remove topology information from an outgoing message and store the removed headers in, for example, a database, a memory, and/or a cache. When a response to the message is received at the intermediate, the topology information can be located and inserted into the response and the response can be forwarded to the sender of the message. Removal and reinsertion of topology information can be controlled by, for example, network policy settings. Some embodiments can provide removal and reinsertion of header information in some cases and encryption in others. This can allow, for example, a network operator to control who can address certain parts of a network and can allow different address realms to be used on an internal network and an external network.

Figure 1:
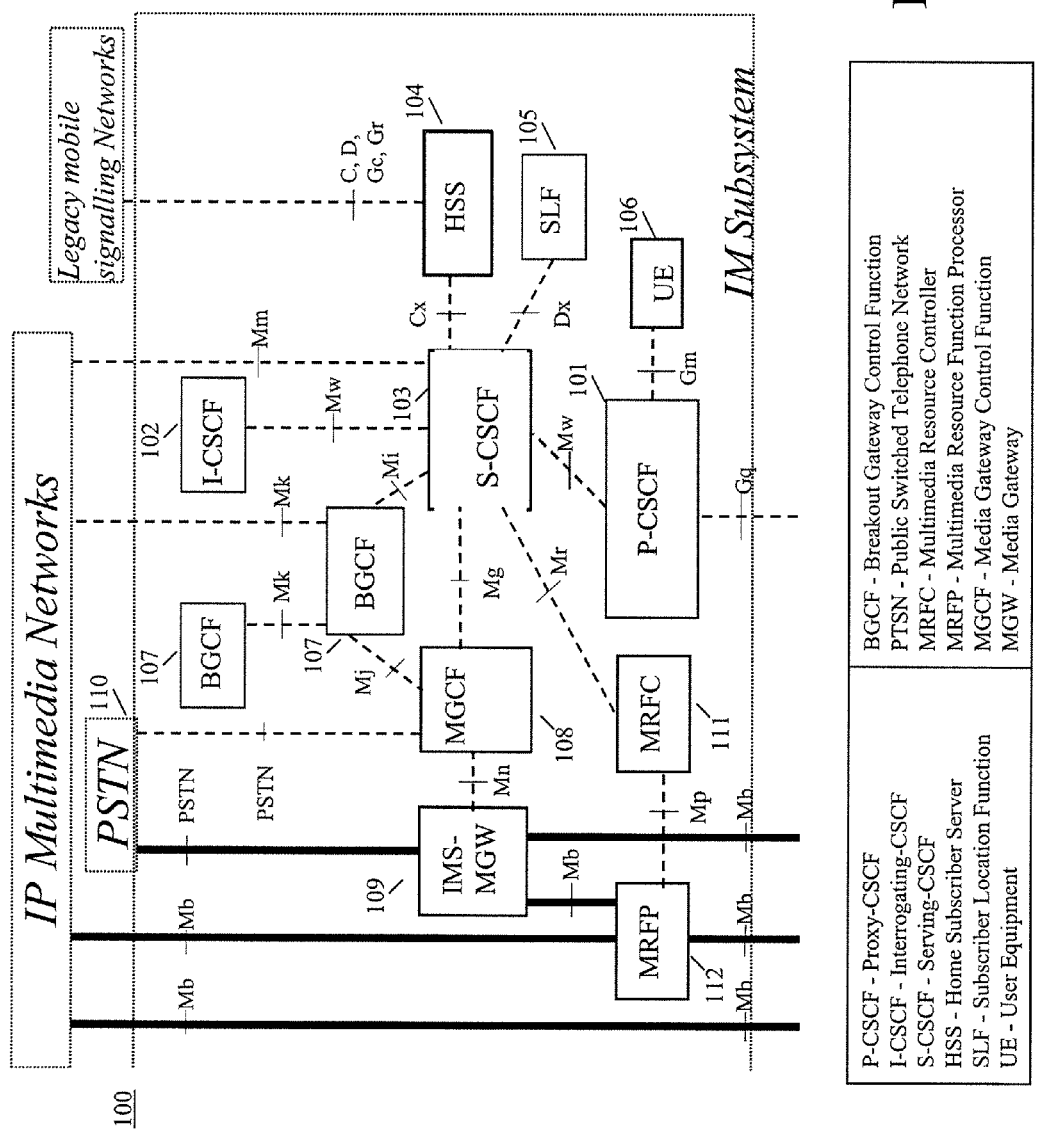
FIG. 1 is a simplified illustration of an IP Multimedia Subsystem (IMS) which can be used in accordance with some embodiments of the disclosed subject matter.

Various embodiments of the disclosed subject matter can be used with various network types, protocols, standards, and/or topologies. For example, FIG. 1 illustrates an IP Multimedia Subsystem (IMS) 100, which is a network architecture that can provide users with mobile and fixed multimedia services implemented as, for example, functions. A function can be implemented on a dedicated node, spread over multiple nodes, or can be implemented on the same node as other functions and/or applications. For example, these functions can be implemented on an ST16 Intelligent Mobile Gateway available from Starent Networks, Corp.

Some functions can be grouped into logical units. For example, a Call Session Control Function (CSCF) includes three functions: a Proxy-CSCF (P-CSCF) 101, an Interrogating CSCF (I-CSCF) 102, and a Serving CSCF (S-CSCF) 103. A CSCF can manage much of the signaling that occurs in an IP IMS core. CSCF functions can be embodied in various forms and can be used with various network topologies and/or standards. For example, a CSCF can be use in both the Global System for Mobile Communications (GSM) standard and the Code Division Multiple Access (CDMA) 2000 standard. The 3rd Generation Partnership Project (3GPP) is responsible for IMS which works with GSM systems. The 3rd Generation Partnership Project 2 (3GPP2) is responsible for Multimedia Domain (MMD) which is used with CDMA systems and is based on the 3GPP IMS concept.

FIG. 1 also includes a Home Subscriber Server (HSS) 104, a Subscriber Location Function (SLF) 105, User Equipment (UE) 106, Breakout Gateway Control Function (BGCF) 107, Media Gateway Control Function (MGCF) 108, Media Gateway (MGW) 109, Public Switched Telephone Network (PSTN) 110, Multimedia Resource Controller (MRFC) 111, Multimedia Resource Function Processor (MRFP) 112. The HSS 104 is a master user database that supports the S-CSCF or other network entities that handle calls and sessions. The HSS 104 stores subscription-related information such as user profiles, performs user authentication and authorization, and can provide information about the physical location of a user. When multiple HSS's are used in a network, an SLF 105 can be used to direct the queries to the HSS 104 storing the information. Legacy signaling networks may also use the HSS 104 for services. The MRFC 111 communicates with the S-CSCF and controls the MRFP 112 to implement media related functions. The combination of the MRFC 111 and MRFP 112 provides a source of media in the home network.

The BGCF 107 is a server that can route based on telephone number and is used when calling to a phone on the circuit switched network. The MGCF 108 and MGW 109 are used to convert signaling from IMS to that which is appropriate for PSTN 110 circuit switched networks. The IP Multimedia Networks can include application servers and other network entities that provide services to User Equipment (UE). The UE can include, for example, a cell phone, a personal digital assistant (PDA), or a laptop computer.

Figure 2:
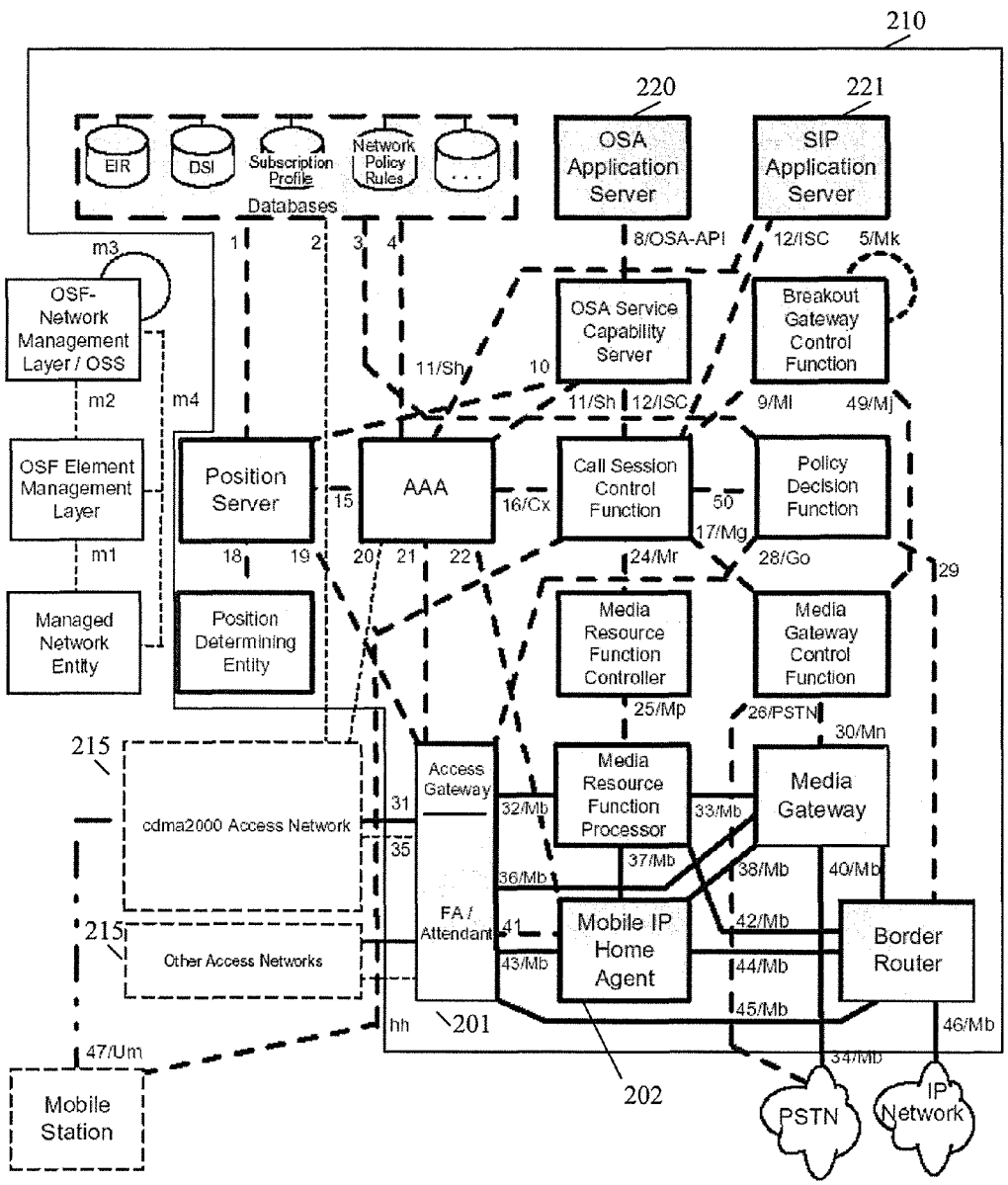
FIG. 2 is a simplified illustration of a Multimedia Domain (MMD) system which can be used in accordance with some embodiments of the disclosed subject matter.

FIG. 2 illustrates an MMD system 210 within a larger network 200. The MMD system 210 includes many of the same functions as the IMS system 100 of FIG. 1, but further includes an access gateway/foreign agent 201 to communicate with access networks 215, as well as a home agent 202 to provide Mobile IP support to mobile stations (e.g., cell phone, PDA, laptop, etc.).

In the context of the IMS and MMD systems, a P-CSCF can be the initial interface between, for example, a mobile device and an IMS. A P-CSCF is typically located in a visited network or in a home network when the visited network is not IMS compliant. The P-CSCF acts as a Session Initiation Protocol (SIP) proxy and can forward messages from the user equipment or mobile station to the appropriate network entity and from a network entity to the user equipment/mobile station. The P-CSCF can inspect messages, provide SIP message compression/decompression using, for example, SIGComp, provide a security associate to the UE/MS, and generate charging data records (CDR) because it sits on the path of the signaling message. The P-CSCF can also include or communicate with a policy decision function (PDF) that authorizes media resources such as the provided quality of service (QoS), management of bandwidth, and provided access.

The I-CSCF is the contact point within a network for connections destined to a user of that network or a roaming user currently located within the network's service area. The I-CSCF assigns an S-CSCF to a user so that the user can communicate with the network. The I-CSCF's IP address can be published in a Domain Name System (DNS) so that remote servers can find it and use it as an entry point.

The S-CSCF performs the session control services for the, for example, UE/MS. This includes handling registration of the UE/MS, inspecting messages being routed through the S-CSCF, deciding which application server provides service, providing routing services such as sending messages to the chosen application server or to a PSTN, and enforcing the policies of a network for a given user. The S-CSCF can also communicate with the HSS to access user profiles and other information.

Application servers (e.g., 220 and 221) can host and execute services such as caller ID, call waiting, call holding, push-to-talk, call forwarding, call transfer, call blocking services, lawful interception, announcement services, conference call services, voicemail, location based services, and presence information. The application servers can interface with the S-CSCF using SIP and, depending on the service, can operate in an SIP proxy mode, an SIP user agent mode, or an SIP back-to-back user agent mode.

Figure 3:
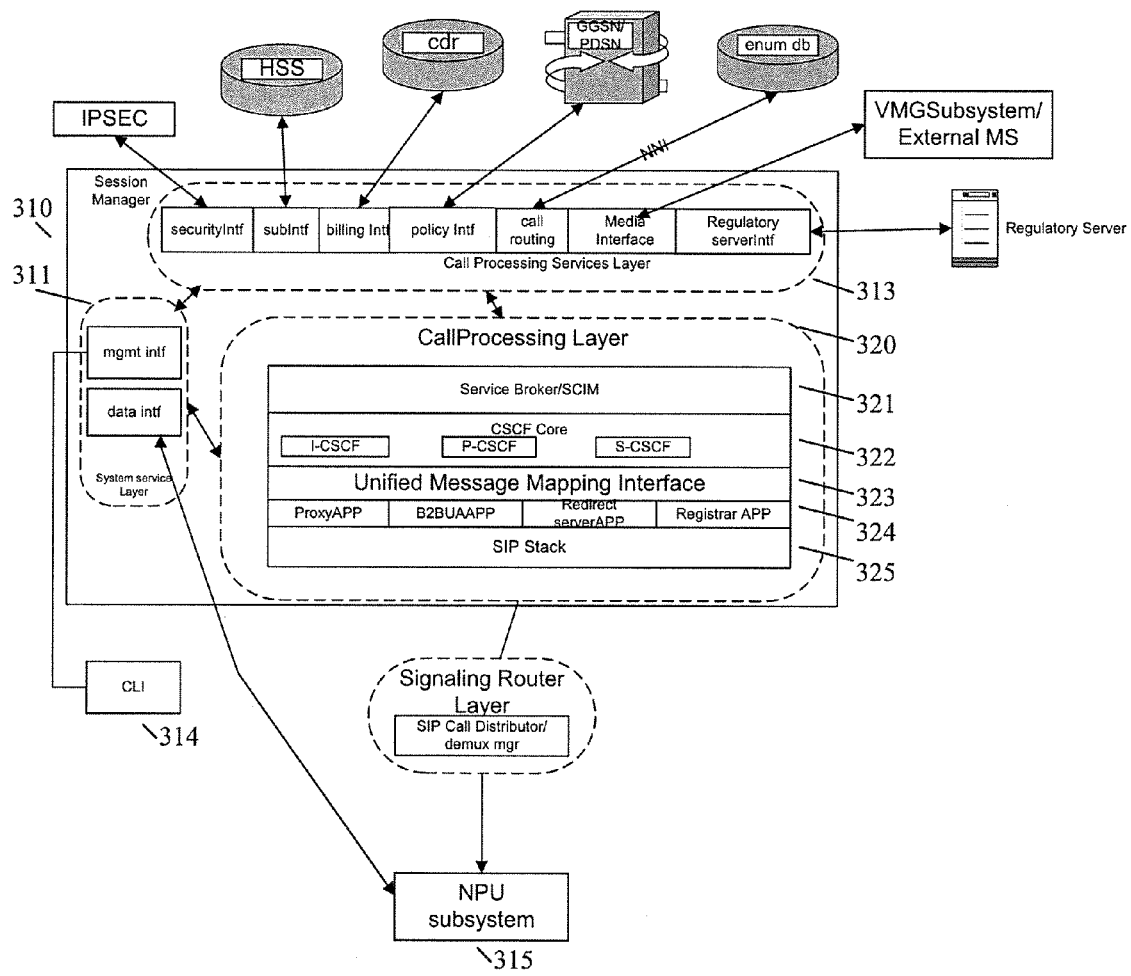
FIG. 3 illustrates a control plane architecture for an IMS/MMD solution that can be used in accordance with some embodiments of the disclosed subject matter.

FIG. 3 illustrates a control plane architecture for an IMS/MMD solution that can be used in accordance with some embodiments. A session manager 310 services and processes user session data flow for user equipment(UE)/mobile subscribers(MS). The session manager 310 includes functional layers such as a system service layer 311, a call processing layer 320, and a call processing support services layer 313. The system services layer 311 provides an interface for instructions to be passed to the session manager 310 and the other layers. A command line interface (CLI) 314 as well as network processing unit interface 315 can be included. The call processing layer includes a service broker/Service Control Interaction Manager (SCIM) 321, a CSCF core 322 that includes an I-CSCF, an P-CSCF, and an S-CSCF, a unified message mapping interface 323, applications 324, and a SIP stack 325. The call processing support services layer 313 includes a variety of services such as routing and address translation service, subscriber management service, changing interface service, media interface service, QoS policy interface service, security interface, and regulatory server interface.

Returning to the call processing layer 320, this layer includes signaling protocols and call control using universal SIP as an application program interface (API). The signaling protocols can be, for example, SIP, ISUP, MGCP, or H.323. Further, the call processing layer 320 allows inter-working between SIP variants and other protocols through a unified messaging mapping (UMM) interface. The UMM interface can convert protocol specific messages and parameters to the universal SIP like API format. SIP like messaging is used, in some embodiments, because SIP has a large message set and can cover the possible messaging scenarios for SIP and other protocols.

SIP messages can include, for example, request messages such as, INVITE, CANCEL, BYE, and ACK. SIP message can also include, response messages, such as, for example, PRACK, MESSAGE, PUBLISH, REFER, UPDATE, and OPTIONS. SIP message headers can include, for example, Via, Record Route, Route Contact, To, and From. Network topology information can be contained in these headers and these headers can be removed and/or encrypted in some embodiments.

Figure 4:
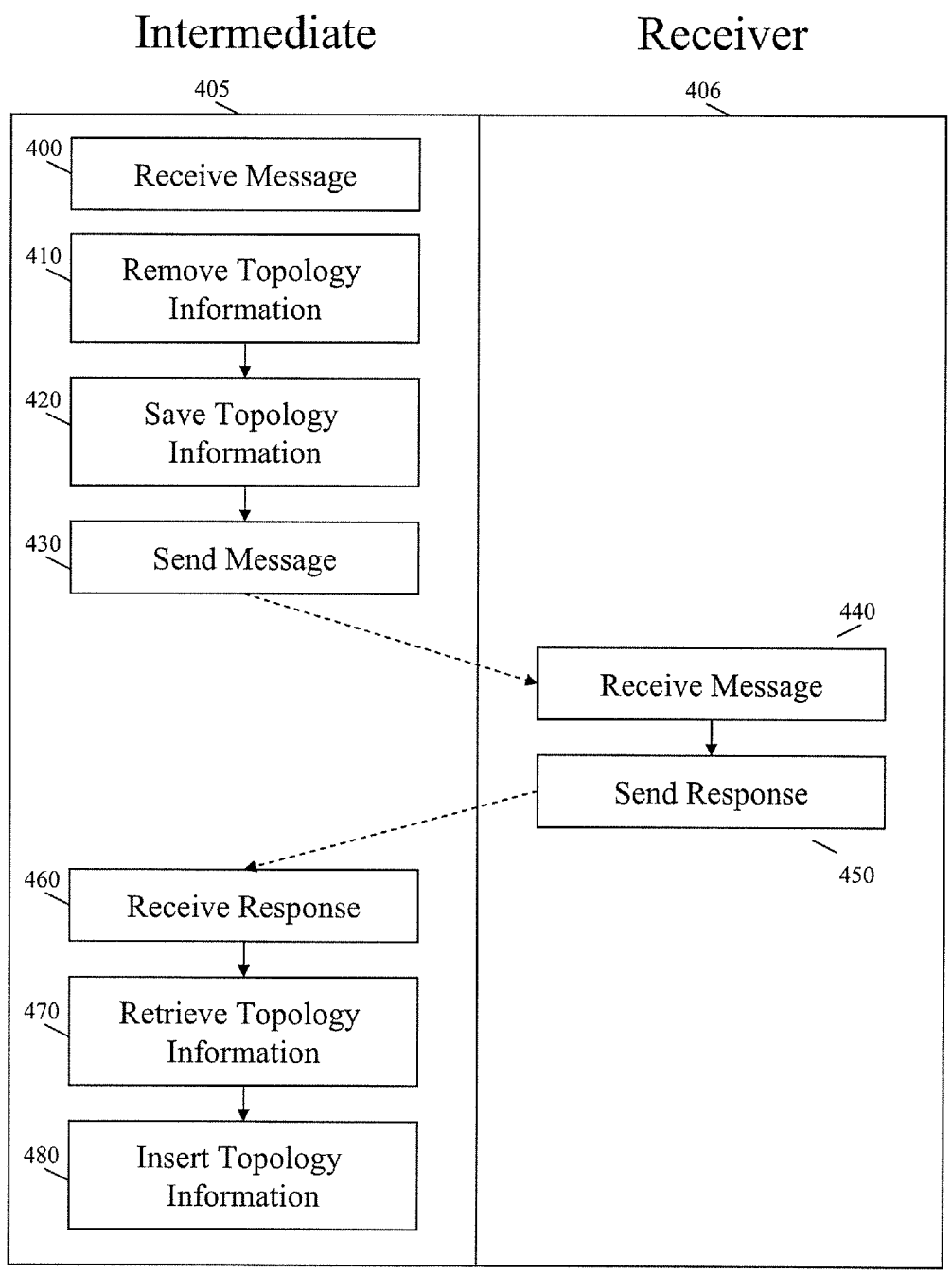
FIG. 4 illustrates a method for performing topology hiding in accordance with some embodiments of the disclosed subject matter.

As illustrated in FIG. 4, in some embodiments, a message can be received, at 400, at an intermediate 405, from, for example, a internal network component. The intermediate 405, can be, for example, a network component at a network boundary, a CSCF, a P-CSCF, an I-CSCF, a proxy server, and/or an SMS proxy server. Topology hiding can be performed by removing information from a message, at 410, and saving the information, at 420. The message can be sent, at 430, to a receiver 406 such as, for example, a UE/MS. The receiver can receive the message at 440 and send a response at 450. When a response to the message is received, at 460, the topology information can be retrieved, at 470, and inserted into the response, at 480. The receiver 406 can be, for example, a device outside of the network of intermediate 405. For example, receiver 406 can be a mobile handset in communication with another device through an access network (e.g., Access Network 215 of FIG. 2).

The topology information can be saved, at 420, in, for example, a database, a cache, RAM, or any appropriate memory. The information can be associated with, for example, a user identifier that can be used to retrieve the information, at 470. The user identifier can be, for example, a public user ID. In some embodiments, the memory space where the information is stored can be reserved and/or allocated to be used for a specific call session and can be released and/or de-allocated when the session ends.

Figure 5:
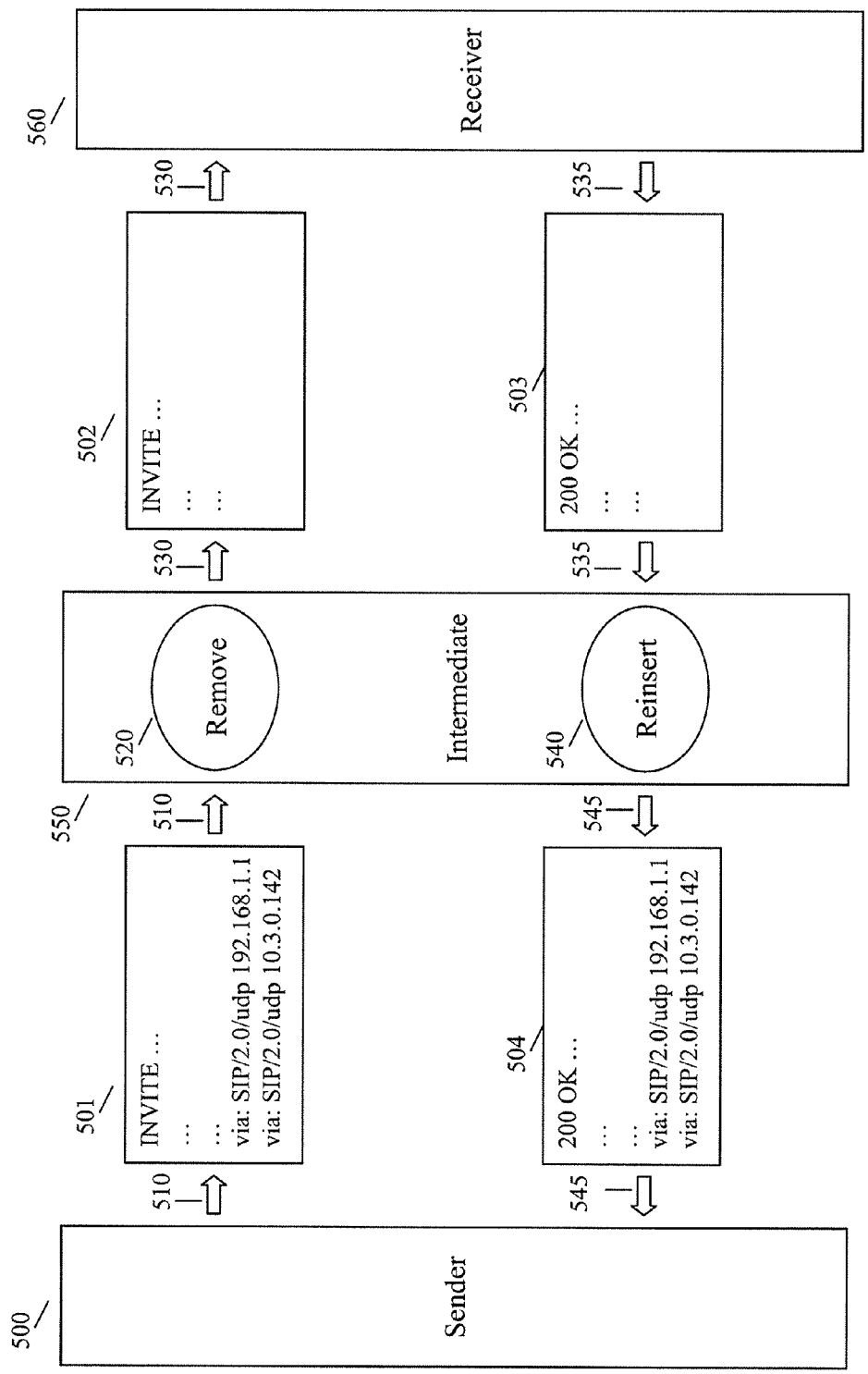
FIG. 5 also illustrates a method for performing topology hiding in accordance with some embodiments of the disclosed subject matter.

FIG. 5 shows another illustration of a method for performing topology hiding. A message 501, for example, an SIP request such as an INVITE, can be sent, at 510, from sender 500. The message 501 can arrive at an intermediate 550 and have its topology information removed and stored, at 520. The message 502 (message 501 without topology information) can be sent, at 530, to a receiver 560. Receiver 560 can send a response 503, at 535. The response 503 can be received at intermediate 550 and have its topology information retrieved and inserted, at 540. The response 504 (503 with the topology information) can be sent, at 545, to sender 500. Intermediate 550, can be, for example, a network component at a network boundary, a CSCF, a P-CSCF, an I-CSCF, a proxy server, and/or an SMS proxy server.

In some embodiments, intermediate 550 can decide to remove only some topology information from message 501. For example, the address of sender 500 can be left in message 501, but other topology information, for example, the addresses of devices that message 501 traveled through between sender 500 and intermediate 550 can be removed. This may be done, for example, if receiver 560 needs to know the address of sender 500. Intermediate 550 can encrypt some topology information and remove other topology information from a message 500. For example, in the previous example, the address of sender 500 can be encrypted. Some embodiments can also select between one of using encryption or removing topology information (e.g. headers) to perform topology hiding. Decisions of whether to and/or what to remove and/or encrypt from topology information can be based on various factors, such as, for example, the identity and/or location of receiver 560, the identity and/or location of sender 500, the identity and/or location of intermediate 550, the type of topology information, the type of message 501, and/or network policy settings (e.g., P-CSCF policy, I-CSCF policy, etc.). In addition, in some embodiments, topology hiding can be enabled or disabled using a command line interface (CLI)/event monitoring service (EMS).

Returning to system 100 of FIG. 1, A P-CSCF 101, according to some embodiments, can perform various tasks upon receiving a message. This message can be, for example, in UMM format and use UMM parameter. On receiving a REGISTER message, for example, a P-CSCF can insert a path header and insert a require header containing the option tag "path." The P-CSCF can create a globally unique IMS charging identity (ICID), save it locally and insert it into the ICID parameter of the p-Charging-Vector header. If the security is supported, a P-CSCF can insert the integrity protected parameter with a "yes" value. Otherwise it can insert the integrity protected parameter with the a "no" value. A P-CSCF can insert a P-Visited-Network-ID header field with a pre-provisioned string that identifies the visited network in the home network. Even if the P-CSCF is local, this string can be inserted to be used for logging purposes.

On receiving 401 from S-CSCF a P-CSCF removes IK and CK values and sends a message to security interface for setting up the security association set up as a result of the challenge. If the security is enabled, a security server header can be inserted in the response. Once the positive response is received from security interface, the P-CSCF can send a returnResultSuccess to callLeg.

On receiving 200 OK response to register, a P-CSCF can check the expires header or expires parameter in contact. If it is non-zero then the service route headers for that public user identity can be stored. The security interface can be sent a message to setup the security association, if a new security association is needed. A message can be sent to the security interface to delete the old security association, if the new association is requested. A P-CSCF can return result success/failure to the callLeg to pass the response received from the security interface.

On receiving a request from UE P-CSCF a P-CSCF can match the service route header for that public user identity against the preloaded route header. If the match is not successful, a result error with a 400 response code can be returned to the callLeg. The P-CSCF's address can be added in the "via" header as configured in the service mode. The P-CSCF's Universal Resource Indicator (URI) can be added in the record route. The P-preferred-ID can removed and the P-Asserted-ID can be added. A globally unique ICID parameter can be created and inserted in the P-charging-Vector header. The result can be sent to the callLeg.

For responses, the P-CSCF can store the value received in the p-charging-function-address header and store the list of record route. The P-CSCF can also change the record route port number to the protected server port number as negotiated with UE during registration.

In some embodiments, a P-CSCF interacts with an IP Security (IPSEC) manager to set up security associations and interact with a policy interface to apply application policies. A P-CSCF can perform I-CSCF discovery in various ways. For example, a P-CSCF can use a configured list of I-CSCF defined by a peering server configuration. In other embodiments, a P-CSCF can perform I-CSCF discovery by using a DNS/Naming Authority Pointer (NAPTR).

IP address spoofing/IMS identity impersonation prevention is provided in certain embodiments. The P-CSCF can compare the IP address the request is received from and the subscriber's contact ip address to make sure the user who is registered is the one trying to make a call. The P-CSCF can also check the ip address allocated at the Packet Data Protocol (PDP) context creation with the IP address in the received SIP request to make sure the user who is paying for the IMS is using its own data access.

In some embodiments, the I-CSCF interfaces with HSS to validate visited network information sent by P-CSCF. If the subscriber is not allowed to roam in the visited network, the HSS sends an error indicating that roaming is not allowed. In certain embodiments, where the CSCF functionality is integrated into a Core CSCF module, the I-CSCF does not have to discover the S-CSCF based on the registering user and capabilities. In the second configuration when P-CSCF is separate I-CSCF is still integrated with S-CSCF therefore discovery is not required. External S-CSCF discovery can also be used by requesting an additional attribute from the HSS and selecting the S-CSCF based on the capabilities requested by the subscriber Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways within the scope and spirit of the invention.

What is claimed is:

1. A method, comprising: receiving, at an intermediate, a message including topology information from a sender in an internal network, the topology information identifying in the internal network at least two network devices between the sender and the intermediate that the message traveled through, wherein the identification of the at least two network devices defines at least part of a network topology of the internal network, the message addressed to a receiver in an external network;
   determining whether to remove all of the topology information in the message or only a part of the topology information in the message based at least in part on at last one of an address of the sender, an address of the intermediate, and a type of the topology information;
   if the determination is to remove only a part of the topology information, identifying parts of the topology information to remove based at least in part on at least one of the address of the sender, the address of the intermediate, and the type of the topology information;
   removing, from the message, the identified at least parts of the topology information, identifying the at least two network devices in the internal network such that the message no longer includes the removed topology information or any variations thereof;
   associating the removed topology information with an identifier;
   saving the removed topology information;
   sending the message to the receiver in the external network;
   receiving a response from the receiver;
   retrieving the removed topology information based on the identifier;
   inserting the removed topology information into the response; and
   sending the response to the sender.

2. The method of claim 1, further comprising:
   encrypting at least part of the topology information; and
   decrypting the encrypted topology information.

3. The method of claim 1, wherein the intermediate is a proxy server.

4. The method of claim 1, wherein the intermediate is a Call Session Control Function.

5. The method of claim 1, wherein the intermediate is a Proxy Call Session Control Function.

6. The method of claim 1, wherein the intermediate is a Serving Call Session Control Function.

7. The method of claim 1, wherein the intermediate is an Interrogating Call Session Control Function.

8. The method of claim 1, wherein the message is part of a call session and further comprising:
   allocating a memory space in response to an establishment of the call session to store the removed topology information and, if requested, to return the stored topology information based on the identifier; and
   deallocating the memory space in response to a termination of the call session.

9. The method of claim 1, wherein the intermediate is located at a network boundary.

10. The method of claim 1, wherein the identifier is a public user identifier.

11. The method of claim 1, wherein the message and the response are in unified messaging mapping (UMM) format.

12. The method of claim 1, wherein the topology information is part of a header.

13. The method of claim 1, wherein the identifier includes a user identifier.

14. A non-transitory computer-readable medium storing computer-executable instructions that, when executed by a processor, cause the processor to perform a method, the method comprising:
   receiving at an intermediate a message including topology information from a sender in an internal network, the topology information identifying in the internal network at least two network devices between the sender and the intermediate that the message traveled through, wherein the identification of the at least two network devices defines at least part of a network topology of the internal network, the message addressed to a receiver in an external network;
   determining whether to remove all of the topology information in the message or only a part of the topology information in the message based at least in part on at least one of an address of the sender, an address of the intermediate, and a type of the topology information;
   if the determination is to remove only a part of the topology information, identifying parts of the topology information to remove based at least in part on at least one of the address of the sender, the address of the intermediate, and the type of the topology information;

removing from the message at least part of the topology information identifying the at least two network devices in the internal network such that the message no longer includes the removed topology information or any variations thereof;

associating the removed topology information with an identifier;

saving the removed topology information;

sending the message to a receiver;

receiving a response from the receiver;

retrieving the removed topology information based on the identifier;

inserting the removed topology information into the response; and sending the response to the sender.

15. The computer-readable medium of claim 14, the method further comprising:
encrypting at least part of the topology information; and
decrypting the encrypted topology information.

16. The computer-readable medium of claim 14, wherein the intermediate is a proxy server.

17. The computer-readable medium of claim 14, wherein the intermediate is a Proxy Call Session Control Function.

18. The computer-readable medium of claim 14, wherein the intermediate is a Serving Call Session Control Function.

19. The computer-readable medium of claim 14, wherein the intermediate is an Interrogating Call Session Control Function.

20. The computer-readable medium of claim 14, wherein the message is part of a call session and the method further comprising:
allocating a memory space in response to an establishment of the call session to store the removed topology information and, if requested, to return the stored topology information based on the identifier; and
deallocating the memory space in response to a termination of the call session.

21. The computer-readable medium of claim 14, wherein the identifier includes a user identifier.

22. An intermediate apparatus in a network, comprising:
a memory;
an interface; and
a processor in communication with the memory and the interface, wherein the processor:
receives a message including topology information from a sender in an internal network, the topology information identifying in the internal network at least two network devices between the sender and the intermediate apparatus that the message traveled through, wherein the identification of the at least two network devices defines at least part of the network topology of the internal network, the message addressed to a receiver in an external network from the interface;
determines whether to remove all of the topology information in the message or only a part of the topology information in the message based at least in part on at least one of an address of the sender, an address of the intermediate, and a type of the topology information;
if the determination is to remove only a part of the topology information, identifying parts of the topology information to remove based at least in part on at least one of the address of the sender, the address of the intermediate, and the type of the topology information;
removes from the message at least part of the topology information identifying the at least two network devices in the internal network such that the message no longer includes the removed topology information or any variations thereof;

associates the removed topology information with an identifier;

saves the removed topology information in the memory;

sends the message through the interface;

receives a response from the interface;

retrieves the removed topology information from the memory based on the identifier;

inserts the removed topology information into the response; and sends the response to the through the interface.

23. The intermediate apparatus of claim 22, wherein the intermediate apparatus is a proxy server.

24. The intermediate apparatus of claim 22, wherein the processor further:
encrypts at least part of the topology information; and
decrypts the encrypted topology information.

25. A wireless communication system comprising:
means, responsive to receiving at an intermediate a message including topology information from a sender in an internal network, the topology information identifying in the internal network at least two network devices between the sender and the intermediate that the message traveled through, wherein the identification of the at least two network devices defines at least part of a network topology of the internal network, the message addressed to a receiver in an external network, for determining whether to remove all of the topology information the message or only a part of the topology information in the message based at least in part on at least one of an address of the sender, an address of the intermediate, and a type of the topology information, and if the determination is to remove only a part of the topology information, identifying parts of the topology information to remove based at least in part on at least one of the address of the sender, the address of the intermediate, and the type of the topology information, and for removing from the message at least part of the topology information identifying the at least two network devices in the internal network such that the message no longer includes the removed topology information or any variations thereof;

means for associating the removed topology information with an identifier; means for saving the removed topology information; means for sending the message to a receiver;

means, responsive to receiving a response from the receiver, for retrieving the removed topology information based on the identifier;

means for inserting the removed topology information into the response; and for sending the response to the sender.

26. The intermediate apparatus of claim 22, wherein the identifier includes a user identifier.

27. The intermediate apparatus of claim 22, wherein the message is part of a call session and wherein the processor further:
allocates a memory space in response to an establishment of the call session to store the removed topology information and, if requested, to return the stored topology information based on the identifier; and
de-allocates the memory space in response to a termination of the call session.

* * * * *